Figure 1:
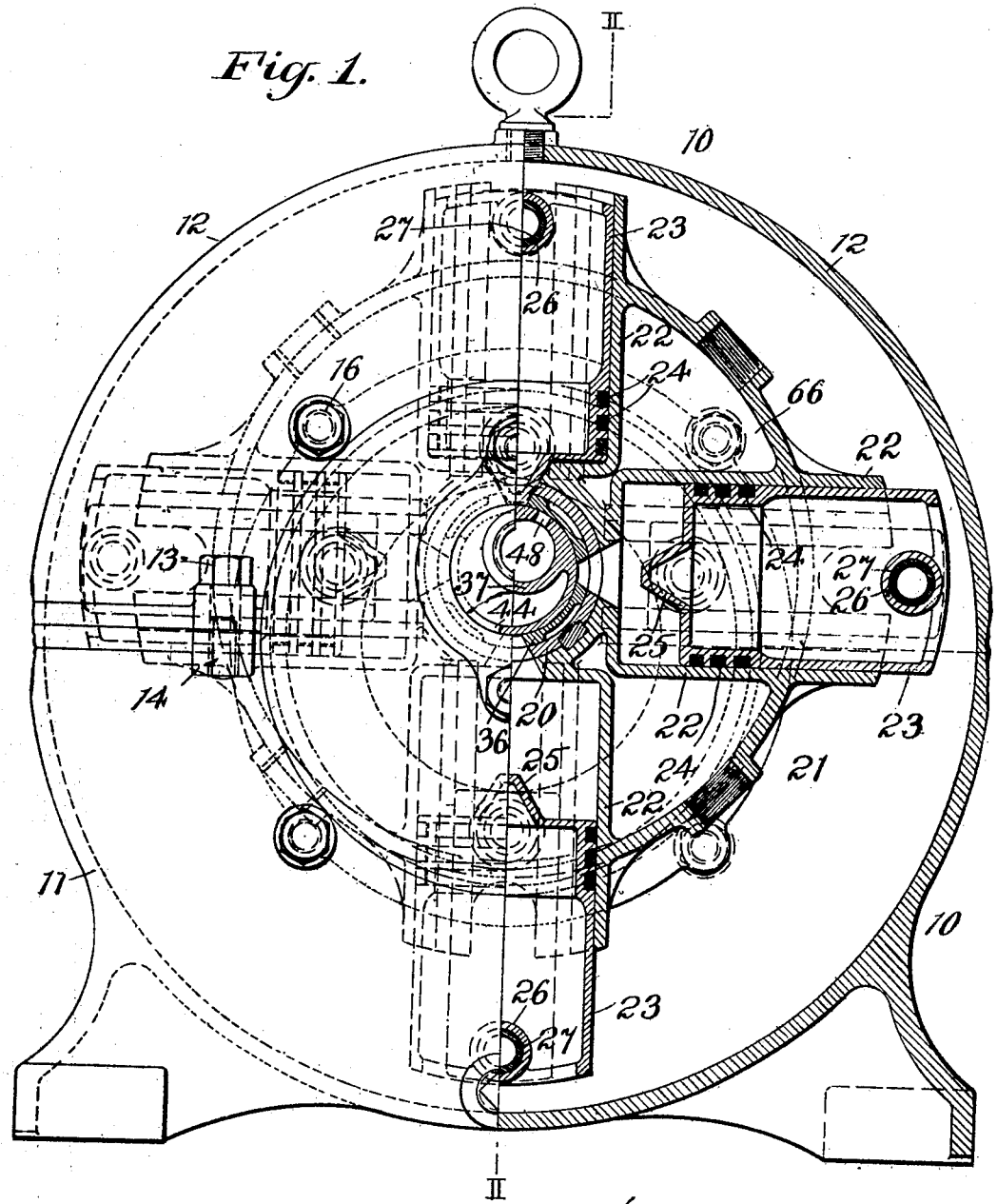

I. PATRICK.
AIR COMPRESSOR, &c.
APPLICATION FILED MAR. 2, 1908.

904,219.

Patented Nov. 17, 1908.
5 SHEETS—SHEET 1.

WITNESSES:

Isaac Patrick INVENTOR.

BY

ATTORNEYS

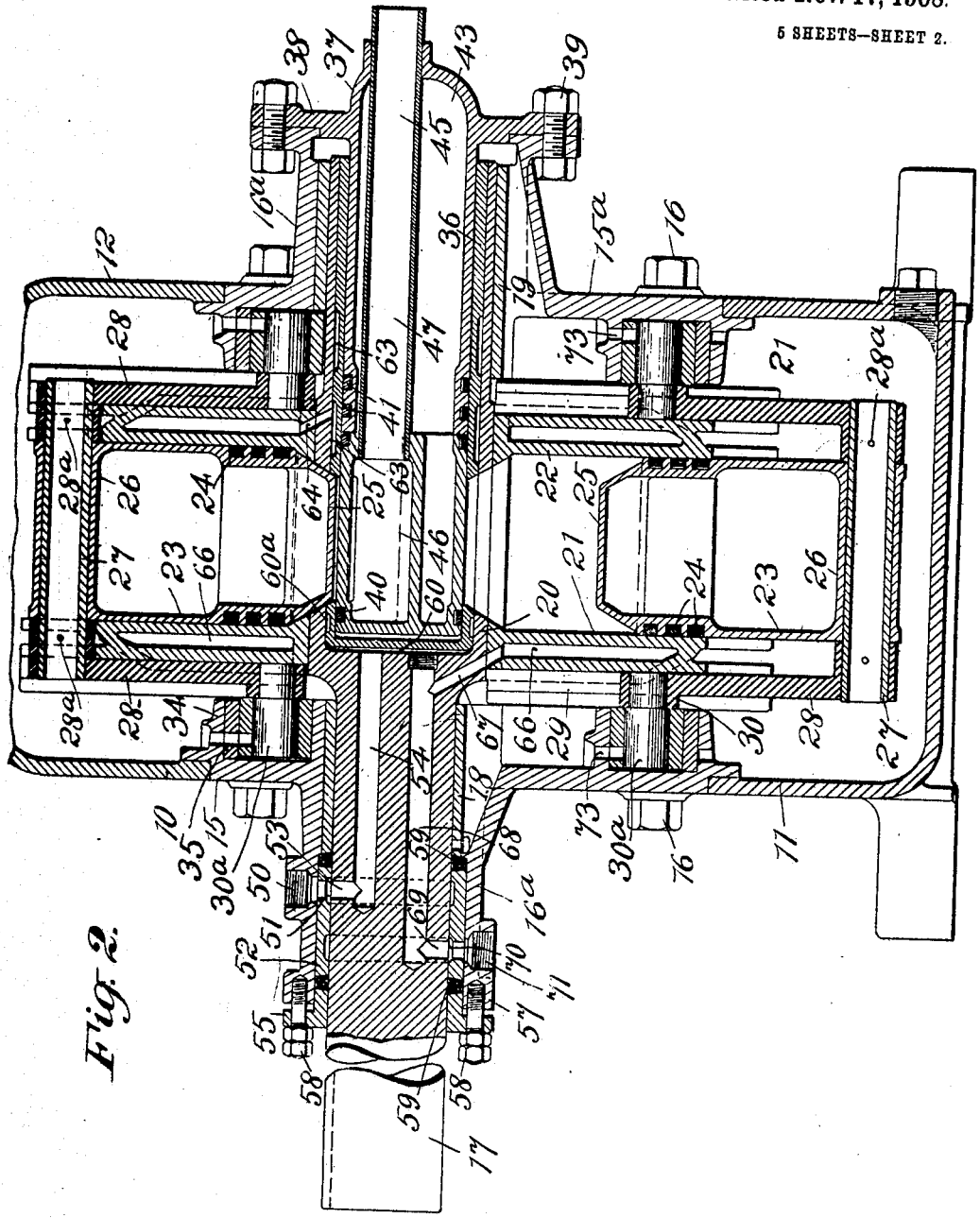

I. PATRICK.
AIR COMPRESSOR, &c.
APPLICATION FILED MAR. 2, 1908.
904,219.
Patented Nov. 17, 1908.
5 SHEETS—SHEET 3.
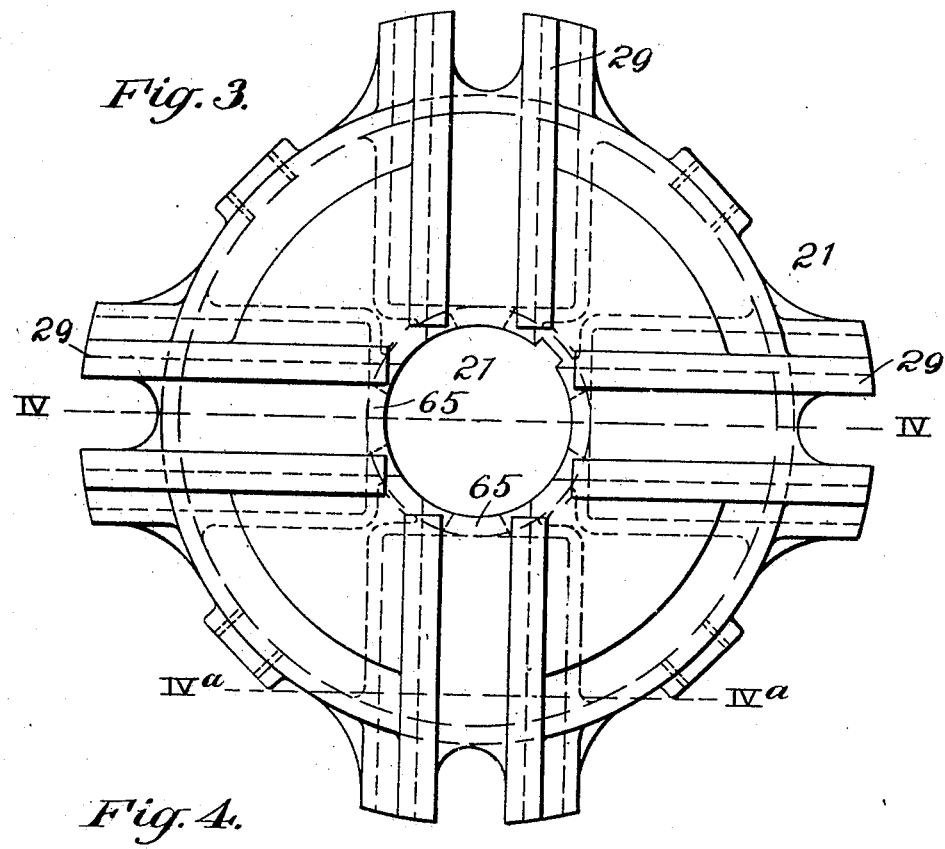
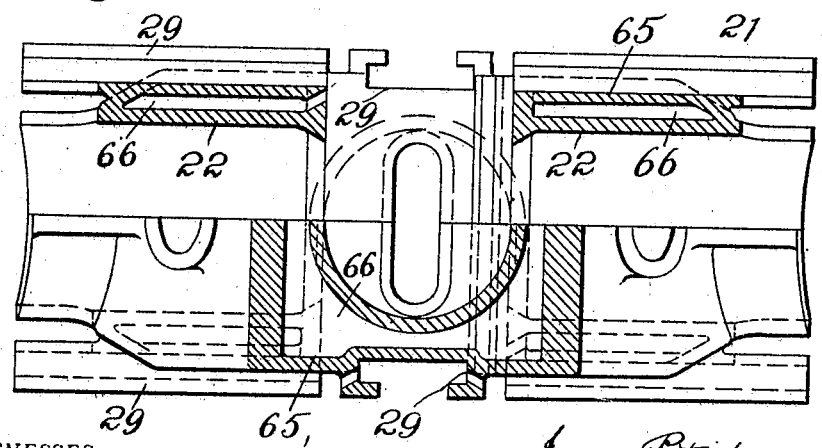
WITNESSES:
Isaac Patrick INVENTOR.
BY
ATTORNEYS

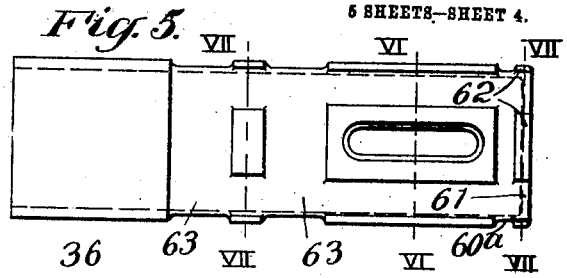

I. PATRICK.
AIR COMPRESSOR, &c.
APPLICATION FILED MAR. 2, 1908.
904,219.
Patented Nov. 17, 1908.
5 SHEETS—SHEET 5.
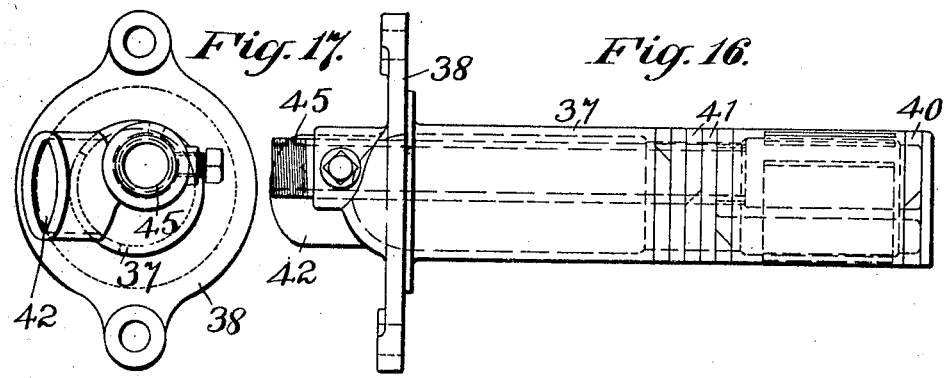
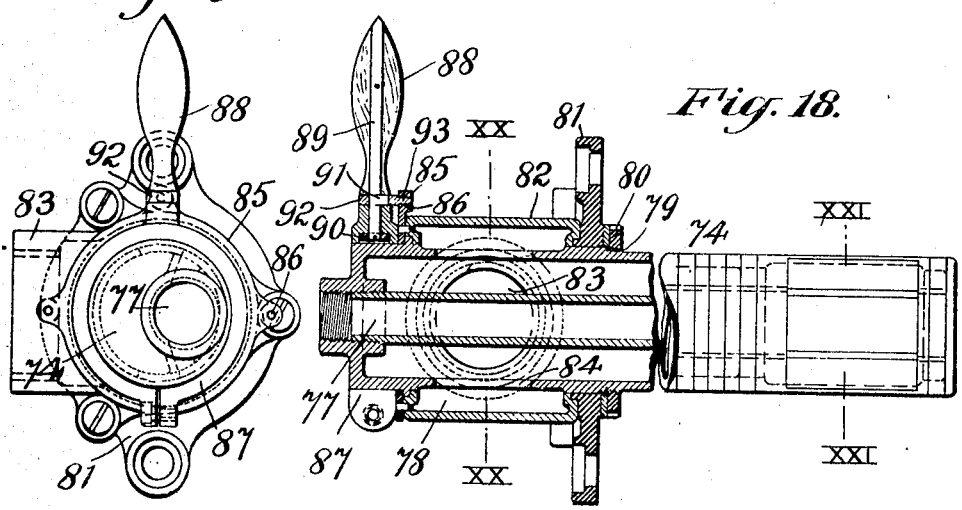
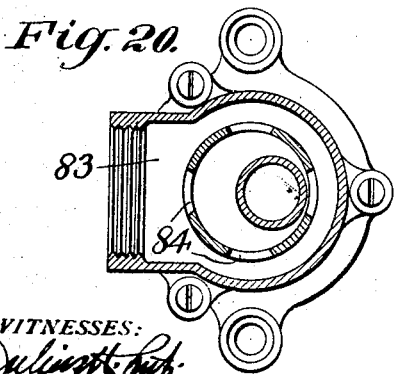
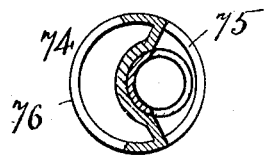
WITNESSES:
Isaac Patrick INVENTOR.
BY Cuswell & Cuswell ATTORNEYS.

UNITED STATES PATENT OFFICE.

ISAAC PATRICK, OF NEW YORK, N. Y.

AIR-COMPRESSOR, &c.

No. 904,219.

Specification of Letters Patent.

Patented Nov. 17, 1908.

Application filed March 2, 1908. Serial No. 418,742.

*To all whom it may concern:*

Be it known that I, ISAAC PATRICK, a subject of the King of England, and a resident of New York, borough of Brooklyn, county of Kings, and State of New York, have invented certain new and useful Improvements in Air-Compressors, &c., of which the following is a full, clear, and exact description.

This invention relates more particularly to a high speed rotary air compressor which is adapted also for use as a steam engine, vacuum or other pump.

The primary object of the invention is to provide simple and efficient means in which a proper reciprocatory motion is imparted to the pistons; to provide means for reducing the friction due to the centrifugal or other forces that may act upon the mechanism; to provide simple means whereby each piston is independent of the other pistons; to so arrange the parts that they will be properly balanced in order that a very high speed may be obtained with the advantages resulting therefrom; to provide proper lubrication for all of the working parts; and to provide efficient means for cooling the working parts of the mechanism when used as a compressor or pump.

Other objects of the invention are to so construct the parts that they are easy of access and that the internal mechanism may be reached without disturbing any of the working parts or pipe connections; to provide against the use of screws or small parts in the internal mechanism of the machine which are likely to work loose; to provide against any but an axial strain on the pistons; and to increase the efficiency by simple means whereby a perfect circulation of water or other cooling medium is obtained to keep the working parts and valve cool.

A further object of the invention is to provide a simple and efficient machine which is adapted without any substantial change to be used either as an air compressor, steam engine, vacuum or other pump.

With these and other objects in view, the invention will be hereinafter more particularly described with reference to the accompanying drawings, which form a part of this specification, and will then be pointed out in the claims at the end of the description.

In the drawings, Figure 1 is a front elevation, partly in section, of one form of machine embodying my invention. Fig. 2. is a longitudinal section taken on a line II—II of Fig. 1. Fig. 3. is a detail elevation of the cylinder frame or casing. Fig. 4. is a sectional plan view, partly in elevation, the section being taken partly on the line IV—IV and partly on the line IV$^a$—IV$^a$ of Fig. 3. Fig. 5. is a detail elevation of the sleeve which fits within the shaft, showing how the water or other cooling medium is caused to pass around the valve to the jacketed cylinders to keep the same cool. Fig. 6. is a vertical section taken on the line VI—VI of Fig. 5. Fig. 7. is a section taken on either of the lines VII—VII of Fig. 5. Figs. 8 and 9 are side and end elevations, respectively, of the links which operate the pistons. Figs. 10 and 11 are end and side elevations, respectively, of the pin which fits into one end of each link. Figs. 12 and 13 are end and side elevations, respectively, of the friction rolls arranged on the pin shown in Figs. 10 and 11. Fig. 14. is a detail elevation of the cam which imparts movement to the pistons. Fig. 15. is a vertical section taken on a line XV—XV of Fig. 14. Fig. 16 is a detail side elevation of the valve which may be used when the machine is employed as a compressor. Fig. 17. is an end view of the valve shown in Fig. 16. Fig. 18. is a vertical section, partly in elevation, of a valve somewhat similar to that shown in Figs. 16 and 17 but more particularly adapted for use when the machine is operating as a steam engine. Fig. 19. is an end elevation of the valve shown in Fig. 18. Fig. 20. is a transverse section taken on a line XX—XX of Fig. 18; and Fig. 21. is a transverse section taken on a line XXI—XXI of Fig. 18.

While I show my invention as of a particular construction in which the parts are made in a certain way, it is to be understood that the parts may be variously constructed and the invention employed in any connection for which it may be used, and that where I employ the words "machine" or "engine" they are intended to be used in their broadest sense to include either a compressor, a pumping engine of any character for which the invention may be used, or a rotary steam engine, and that where changes are necessary to adapt the invention for these purposes such changes may be made without departing from the character of the invention.

The invention as illustrated is arranged for compressing air, and in such illustrations the casing 10 is shown as comprising a base-member 11 and a cap-member 12 which is removably held to the base-member by means of bolts 13 which pass through lugs or parts 14 of the casing at the front and rear thereof, and also at the sides, the latter lugs being broken off. Annular cam members 15 and 15ª are secured to each face of the casing 10 by means of bolts 16, and these members are each provided with a part or extension 16ª which may be formed integral with the member, and such extensions form bearings and support the main shaft 17. The shaft 17 is journaled at one end in a sleeve or bushing 18 and at its other end in a sleeve or bushing 19, which are held in the members 15 and 15ª so as to provide a proper bearing and wearing surface for the shaft 17. The shaft 17 has an enlarged part 20 and to this enlarged part is secured the cylinder casing 21. As shown the cylinder casing 21 is provided with four radially arranged and integral cylinders 22, though this number may vary, and such cylinders have their ends open and move with the shaft 17 as the latter rotates, and in each cylinder is adapted to move a piston 23. Each piston 23 may be hollow and is provided with suitable packing rings 24 at or near its inner end and is provided with a tapering extended portion 25 which is adapted to enter a similarly formed opening in the end of the cylinder and shaft 17 for a purpose to be presently described.

The pistons are provided with a transverse boss or sleeve 26 and in this sleeve is held a tubular shaft or wrist-pin 27, the outer ends of which are held in openings in the end of links 28 by means of pins 28ª or otherwise. These links 28 may be of any suitable form and are preferably substantially rectangular in form and are arranged to slide in slots 29 in the cylinder casing 21. The slots 29 are T-shaped in cross section and are radially arranged so as to permit the boss 30 on the inner end of each link 28 to move radially, and each link at its inner end is provided with a stud 30ª on the end of which may be arranged a friction roll 31. These rolls are adapted to travel in a cam way or groove 32 of the cam members 15 and 15ª, and these cam members are eccentrically arranged with respect to the axis of the shaft 17 and form fixed cams with respect to said shaft, the said cam grooves being arranged in the members 15 and 15ª between the integral and annular flanges 33 and 34, though such flanges may be attached to the members 15 and 15ª or otherwise arranged as desired. A ring 35 of steel, or other metal, is held within the outer annular flange 34 of each cam member so as to take the wear and strain of the rolls 31, for as the cylinders rotate with the pistons, the centrifugal force will be such as to keep the rolls in contact with the rings 35 in such a way that the friction is materially reduced. As will be seen when the shaft 17 and cylinder casing is rotated in any preferred way, the rolls in traveling in the cam grooves will impart reciprocatory movement to each of the pistons, and that said pistons in this way are entirely independent of each other and may be so arranged that they will balance each other during the rotary movement so that a high speed without much vibration may be obtained.

The end 20 of the shaft 17 is provided with a central and longitudinally-extending recess or opening, and forced into the opening in said shaft is a tubular bushing or sleeve 36 of brass, bronze or other metal so as to rotate with said shaft and within said sleeve or bushing 36 is arranged a valve 37. This valve 37 may be of any suitable form. As shown it is provided at its outer end with a flange 38, and this flange is securely held to the member 15ª by means of bolts 39 or otherwise so that said valve may be held stationary. This valve 37 is provided at its inner end with a packing ring 40 at one side of the pistons, and with a plurality of packing rings 41 on the opposite side of said pistons, and said valve has an opening 42 which serves as an intake for the air or other gas or liquid and communicates with the chamber 43 within said valve. The chamber 43 is provided with an opening 44 with which the cylinders are adapted to successively communicate during their rotary movement, and extending lengthwise of the valve is an exhaust or discharge 45. This discharge is arranged to one side of the chamber 43 and comprises a chamber 46 and a pipe 47 and in the chamber 46 is a port 48. This port 48 is so positioned with respect to the opening 44 of the intake, the cylinders and the pistons in said cylinders, that the pistons will have the proper degree of movement to create a certain degree of vacuum within the cylinders before the said cylinders register with the intake, so that the air will rush with considerable force into the cylinders when the cylinders register with the openings 44, thereby increasing the volume of air which will fill the cylinders and also assist in the movement of the pistons and the out-stroke thereof. The port 48 is positioned so that the desired pressure or compression of the air is obtained before the air is permitted to pass into the discharge chamber 46 and through the pipe 47, the size and position of the port determining the extent to which the air is to be compressed. By tapering the inner end of each piston as shown, all the air will be forced from the cylinder as the said tapering end will enter the opening in the part 20 of the shaft 17 and an opening 49 in the sleeve or bushing which fits in the shaft 17 and registers with the opening in said shaft; and while the tapering portions of the pistons are shown as elongated they may be round so that they may be easily turned as the pistons are made in case it is desired to do so.

To cool the various parts when the invention is employed as a compressor, I provide an inlet opening 50 in the bearing 16ᵃ of the casing and to this opening may be connected a water supply-pipe or other means through which water or liquid may pass, and said opening 50 communicates with an annular channel or chamber 51 arranged in the inner part or surface of the bushing 52, and communicating with the channel 51 is an opening 53 which communicates with a longitudinally-extending opening or channel 54 in the shaft 17 so that the said channel 54 and opening 53 will make a substantially L-shaped opening which registers with the channel 51 no matter what position the shaft may be in. The ends of the bushing 52 are beveled and around the shaft is a gland or stuffing-box 55 the flanges of which are held to a flange 57 on the bearing 16ᵃ by means of the studs and nuts 58 so that on tightening the said nuts the gland or stuffing-box will press the packing 59 and 59ᵃ in close contact with the shaft 17 and prevent leakage of the cooling medium. The opening or channel 54 terminates in a recess or space 60 between the head of the tubular sleeve or bushing 36 and the shaft, and said sleeve is provided with an annular channel 60ᵃ which communicates with the space 60 by means of longitudinally-extending grooves or spaces 61 located between the ribs or enlarged portions 62 of said sleeve as shown best in Figs. 5 to 7. The water passes along the grooves or channel 61 to the annular spaces or chambers 63 and from there through one or more openings 64 arranged in the shaft 17 and the cylinder casing so that the entire space around the valve will have water circulating around the same in order to keep the valve cool, as it is at this point where the greatest heat is developed, owing to the compression of the air, so that greater efficiency is obtained by preventing the air from expanding at this point. The channel 64 communicates with the water jacket of one of the cylinders, and each cylinder has its own jacket 65, and the jackets of all the cylinders are adapted to communicate with each other.

As shown best in Figs. 2 to 4 the jacket 65 of each cylinder is rectangular and the spaces 66 between the cylinder proper and the jacket is of sufficient area to hold the necessary amount of water for cooling purposes, and said spaces are interposed between the guides in which the links slide so that the water will keep the guides, as well as the cylinders cool and will thereby cool the links also. As the water circulates around the cylinders and from one to the other it passes from the last cylinder through a channel 67, Fig. 2, to an opening or channel 68 in the shaft 17 and this opening 68 has a transverse opening 69 which communicates with an annular channel 70 in the bushing 52 so that as the shaft rotates the said opening 68 is always in communication with said annular channel. An opening 71 in the bearing 16ᵃ communicates with the channel 70 so that the water or other medium will have a complete and thorough circulation and will come in contact with practically all the moving parts of the machine to keep them cool.

The casing 10 is normally closed and in the case 11 thereof may be provided with a quantity of oil or other lubricant so that the cylinder casing and parts connected therewith may rotate in the lubricant. As the casing rotates the pistons will be forced outward into the lubricant and will collect a sufficient quantity thereof to keep the cylinders properly lubricated and the same result will be produced by the lubricant being forced into the openings 73 in the stationary cams and into the cams grooves 32. Some lubricant also will be forced or carried into the spaces between the sleeve 36 and the valve 37 thus automatically and properly oiling all the working parts.

The shaft 17 with the parts connected therewith may be rotated in any desired way, and may be coupled direct with a motor of any suitable make or may be rotated by means of a pulley secured thereto. As will be seen when the shaft is rotated the cylinder casing and cylinders will be rotated with said shaft, and during the rotation thereof the pistons will be reciprocated in the cylinders by reason of the rolls of the links 27 traveling in the cam grooves of the stationary cams. On the outward movement of the pistons the air from the chamber 43 of the valve will be drawn therein through the inlet 42, and on the inward movement of the piston the air will be compressed and will be forced into and out through the smaller or discharge opening 46 and discharge pipe 47, the position of the ports in the valve being such that a partial vacuum will be created in each cylinder for a part of the stroke for each piston before the air is permitted to rush into said cylinder, and the exhaust port is positioned so that the desired degree of compression is obtained before the discharge takes place.

The invention is not only applicable as a compressor but may be utilized as a vacuum or force pump with very little change, or it may be employed as a rotary steam engine by simply changing the arrangement of the ports somewhat in the stationary valve so that the valve in connection with the pistons and cylinders will perform their required functions.

In Figs. 18 to 21 the valve therein shown is more particularly adapted when the invention is employed as a steam engine, though it may be also used when the invention is employed as a compressor or for other purposes. Here the valve casing 74 has an inlet port 75 and a discharge port 76 and is provided with suitable packing rings to prevent leakage as in the other figures, but the ports are somewhat differently arranged to adapt it as a steam engine. In this case the pipe 77 is the inlet for the steam and the discharge or exhaust is through the chamber 78 so that the steam will enter through said pipe 77 and by means of the ports enter the cylinders at the proper time to impart motion to the pistons and thus rotate the cylinders and shaft. The casing is provided with a threaded part 79 on which are the nuts 80 which are adapted to hold the yoke or flange 81 between the same and a fixed or stationary chamber 82 forming the exhaust for the engine. The chamber 82 provides an annular space around the valve casing and has an exhaust opening 83, and in the valve casing are one or more openings 84 which communicate with said chamber, the yoke or flange 81 being fastened to the casing in a manner similar to the yoke or flange 38, and to said flange is fixed the casing 82. To the casing 82 is secured a ring or flange 85 in which are a series of openings 86, and held to the valve casing adjacent to the ring 85 is another ring or sleeve 87. This ring 87 is split and is adapted to be clamped to the end of the valve casing, so that said casing may be given a partial rotary movement to shift the position of the inlet and exhaust ports. A handle 88 is provided with a rod 89, and this rod is held, by means of a collar 90, to a boss on the sleeve 87 so that it may rotate therein, and on said rod is an eccentric 91 around which is an eccentric ring or strap 92 carrying a pin 93. It will be seen that as the handle is rotated the eccentric 91 will withdraw the pin from the opening 86 so that the handle, sleeve and valve may be moved to a different position so that the position of the ports with respect to the cylinders may be changed when it is desired to cause the engine to move in a reverse direction.

When the machine is employed as a steam engine the steam enters the inlet pipe 77 and passes to the cylinder that communicates with the inlet port and acts to drive the piston outward in said cylinder, the links and the rolls thereon being so positioned that they will ride on the incline of the cam grooves due to the curvature thereof, thereby causing the pistons to reciprocate and the cylinders to rotate. As the cylinders rotate and the pistons reach their extreme throw the steam will then be exhausted through the chamber 78 and exhaust opening 83.

The inlet and exhaust chambers of the valve may be changed at will according to the use to which it is put. It will be seen that the construction of the valve and the means shown in Figs. 18 to 21 may be used when the machine is employed as an engine, compressor or for other purposes and even though the rotary feature forms a part of the machine it need not be used except when necessary.

It will be further seen that the means provided whereby water may be caused to circulate around the working parts to keep them cool when the invention is employed as an air compressor, that the same means employed for cooling may be utilized to superheat the steam when the invention is employed as a steam engine.

From the foregoing it will be seen that simple and efficient means are provided whereby a machine may be used either as an air compressor, steam engine or for other purposes; that proper reciprocatory motion is imparted to the pistons; that the friction due to centrifugal or other forces may be reduced and each piston made entirely independent of the others; that the parts are so constructed that they will not easily get out of order and are readily accessible in case of repairs without disturbing other working parts; that means are provided whereby all the parts may be cooled when the invention is employed as an air compressor or may be utilized to super-heat the steam when employed as a steam engine; and that the parts are so constructed that a very high speed may be obtained without unnecessary vibration of the parts.

Having thus described my invention, I claim as new and desire to secure by Letters Patent:—

1. The combination with a rotary shaft, of a plurality of radially disposed cylinders held to said shaft provided with radially arranged slots, a valve having inlet and discharge openings adapted to communicate with said cylinders, pistons movably held in said cylinders, stationary cams having annular grooves eccentrically arranged with respect to the shaft and located on opposite sides of the cylinders, links movable in the slots of the cylinder casing and connected at one end to each piston on opposite sides thereof, and means carried by the inner end of the links and adapted to move in the cam grooves.

2. The combination with a rotary shaft, of a casing having four radially disposed cylinders rotatably held to said shaft and provided with radially arranged slots, a valve having inlet and discharge openings adapted to communicate with said cylinders, pistons movably held in said cylinders, cams having annular grooves eccentrically arranged with respect to the shaft and located on opposite sides of the cylinders, links movable in the slots of the cylinder casing and connected at one end to each piston on opposite sides thereof, and means carried by the inner end of the links and adapted to move in the cam grooves.

3. The combination with a rotary shaft, of a casing having a plurality of radially disposed cylinders rotatably held to said shaft and each provided with radially disposed and substantially T-shaped slots, a valve having inlet and discharge openings adapted to communicate with said cylinders, pistons movably held in said cylinders, stationary cams having annular grooves eccentrically arranged with respect to the shaft and located on opposite sides of the cylinders, links movable in the slots of the cylinders connected at one end to each piston on opposite sides thereof, and means carried by the inner end of the links and adapted to move in the cam grooves whereby a reciprocatory movement is imparted to each piston independent of the other as the cylinders rotate.

4. The combination with a casing having bearings thereon, of a shaft rotatably held in said bearings and provided with an enlarged part in which is a recess or opening, a bushing fitting in said open end of the shaft, a valve having inlet and discharge openings, means for holding the valve stationary, a plurality of cylinders fixed to the shaft and rotating therewith and adapted to communicate with the inlet and discharge openings of the valve, hollow pistons movably held in said cylinders, and means for operating each piston independently of the others.

5. The combination with a casing having bearings thereon, of a shaft rotatably held in said bearings and provided with a central and longitudinally-extending recess or opening at one end, a bushing fitting said opening of the shaft, a valve having inlet and discharge openings, means for holding the valve stationary, a plurality of cylinders fixed to the shaft and rotating therewith and adapted to communicate with the inlet and discharge openings of the valve, pistons movably held in said cylinders, and means for operating each piston independently of the others.

6. The combination with a hollow inclosing casing having a base member and a cap member detachably connected together, of cam members secured to the casing between the cap member and base member on opposite sides thereof, said cam members having bearings projecting outward therefrom, a shaft rotatably held in said casing, a cylinder casing having a plurality of cylinders secured to said shaft and rotatable therewith, pistons arranged in the cylinders, and means operated by the cam members for reciprocating the pistons.

7. The combination with a casing having a base member and a cap member detachably connected therewith, of cam members secured to the casing between the cap member and base member on opposite sides thereof, a shaft rotatably held in said casing, a plurality of cylinders rotatable with said shaft, pistons arranged in the cylinders, and means operated by the cam members for reciprocating the pistons.

8. The combination with a casing having a base member and a cap member detachably connected therewith, of cam members secured to the casing between the cap member and base member on opposite sides thereof, and forming with said base and cap member a hollow inclosing casing, said cam members having bearings projecting outward therefrom, a shaft rotatably held in said casing, a cylinder casing having a plurality of radially disposed cylinders secured to said shaft and rotatable therewith, pistons arranged in the cylinders, and links operated by the cam members for reciprocating the pistons.

9. The combination with a plurality of rotary cylinders, of a reciprocatory piston held in each of said cylinders, means for reciprocating the pistons as the cylinders rotate, a shaft having an open end and fixed to rotate with the cylinders, a bushing fitting within the open end of the shaft, a stationary valve having inlet and discharge chambers arranged in the bushing and provided with inlet and discharge ports adapted to communicate with the cylinders, said tube being provided with annular chambers and with grooves lengthwise thereof forming a communication between said annular chambers, and means whereby water may be supplied to and made to circulate around said tube to keep the latter cool.

10. The combination with a plurality of rotary cylinders, of a reciprocatory piston held in each of said cylinders, means for reciprocating the pistons independently of each other, a shaft having an open end and held to rotate with the cylinders, a bushing fitting within the open end of the shaft, a valve having inlet and discharge chambers arranged in the bushing and provided with inlet and discharge ports adapted to communicate with the cylinders, said tube being provided with annular chambers and with grooves lengthwise thereof forming a communication between said annular chambers, and means whereby a medium may be supplied to and made to circulate around said tube.

11. The combination with a plurality of rotary cylinders, of a reciprocatory piston held in each of said cylinders, means for reciprocating the pistons, a shaft having an open end and held to rotate with the cylinders, a bushing fitting within the open end of the shaft, a valve having inlet and discharge chambers arranged in the bushing and provided with inlet and discharge ports adapted to communicate with the cylinders, said tube being provided with annular chambers and with grooves lengthwise thereof forming a communication between said annular chambers, means for holding the valve stationary, and means whereby a medium may be supplied to and made to circulate around said tube.

12. The combination with a casing having suitable bearings thereon, of a shaft journaled in said bearings and rotatably held therein, a cylinder casing fixed to the shaft so as to rotate therewith and provided with a plurality of radially disposed cylinders, a hollow piston having a tapered lower end adapted to reciprocate in each cylinder, links connected to each piston, stationary cams for imparting movement to the links, said shaft being provided with an enlarged part and an opening extending lengthwise within the same centrally thereof, a bushing fitting within said opening of said shaft, said bushing and shaft being provided with openings in alinement with the openings in the cylinders to permit the tapered part of the pistons to enter the same, a stationary valve provided with inlet and discharge chambers held within the bushing and provided with inlet and discharge ports adapted to communicate with the cylinders, and means whereby a medium may be caused to pass through the shaft around the valve and to and around the cylinders.

13. The combination with a casing having suitable bearings thereon, of a shaft journaled in said bearings and rotatably held therein, a cylinder casing fixed to the shaft so as to rotate therewith and provided with a plurality of radially disposed cylinders, a hollow piston having a tapered lower end adapted to reciprocate in each cylinder, links connected to each piston, cams for imparting movement to the links, said shaft being provided with an enlarged part and an opening extending lengthwise within the same centrally thereof, a bushing fitting within said opening, said bushing and shaft being provided with openings in alinement with the openings in the cylinders to permit the tapered part of the pistons to enter the same, a valve provided with inlet and discharge chambers held within the bushing and provided with inlet and discharge ports adapted to communicate with the cylinders, and means whereby water may be caused to pass through the shaft around the valve and to and around the cylinders.

14. The combination with a casing having suitable bearings thereon, of a shaft journaled in said bearings and rotatably held therein, a cylinder casing fixed to the shaft so as to rotate therewith and provided with a plurality of cylinders, a piston having a tapered lower end and adapted to reciprocate in each cylinder, transverse sleeves integral with the pistons, wrist pins having rotary movement held in the sleeves, links held to each wrist pin, cams for imparting movement to the links, said shaft being provided with an enlarged part and an opening extending lengthwise within the same centrally thereof, a bushing fitting within said opening, said bushing and shaft being provided with openings in alinement with the openings in the cylinders to permit the tapered part of the pistons to enter the same, a valve provided with inlet and discharge chambers held within the bushing and provided with inlet and discharge ports adapted to communicate with the cylinders, and means whereby a medium may be caused to pass through the shaft around the valve and to and around the cylinders.

15. The combination with a casing having suitable bearings thereon, of a shaft journaled in said bearings and rotatably held therein, a plurality of cylinders fixed to the shaft so as to rotate therewith and each provided with radial slots on opposite sides thereof, a piston having a tapered lower end adapted to reciprocate in each cylinder, links connected to each piston and movable in the radial slots, stationary cams for imparting movement to the links, said shaft being provided with an opening extending lengthwise within the same centrally thereof, a valve provided with inlet and discharge ports adapted to communicate with the cylinders, means for holding the valve stationary, and means whereby a medium may be caused to pass through the shaft around the cylinders.

16. The combination with a suitable support having bearings thereon, of a shaft journaled in said bearings and rotatably held therein, a cylinder casing fixed to the shaft so as to rotate therewith and provided with a plurality of radially disposed cylinders each having radially disposed substantially T-shaped slots on opposite sides thereof, a hollow piston having a contracted inner end adapted to reciprocate in each cylinder, links movable in the radial slots and connected to each piston, stationary cams for imparting movement to the links, said shaft being provided with an opening extending lengthwise within the same centrally thereof, a valve provided with inlet and discharge ports held within the shaft and adapted to communicate with the cylinders, and means whereby a medium may be caused to pass through the shaft around the cylinders.

17. The combination with a suitable support having bearings thereon, of a shaft journaled in said bearings and rotatably held therein, a plurality of radially disposed cylinders rotatable with said shaft and each provided with radially disposed slots on opposite sides thereof, a piston having a contracted inner end adapted to reciprocate in each cylinder, links movable in the slots and connected to wrist pins, sleeves extending transversely of the pistons at their upper ends, wrist pins held in the sleeves, stationary cams for imparting movement to the links and to each piston independently, a valve provided with inlet and discharge ports held within the shaft and adapted to communicate with the cylinders, and means for holding the valve stationary.

18. The combination with a casing having suitable bearings thereon, of a shaft journaled in said bearings and rotatably held therein, a plurality of radially disposed cylinders rotatable with said shaft, a hollow piston having a tapered lower end adapted to reciprocate in each cylinder, links connected to each piston at the upper end thereof, stationary cams for imparting movement to the links, and eccentrically arranged with respect to the shaft, said shaft being provided with an opening extending lengthwise within the same centrally thereof, a bushing fitting within said opening, said bushing and shaft being provided with openings in alinement with the openings in the cylinders to permit the tapered part of the pistons to enter the same, a valve provided with inlet and discharge chambers held within the bushing and provided with inlet and discharge ports adapted to communicate with the cylinders, means for holding the valve stationary, and means whereby water may be caused to pass through the shaft around the valve and to and around the cylinders.

19. The combination with a plurality of cylinders each provided with a jacket forming an inclosed space around each cylinder, of a shaft rotatably held to the cylinders and provided with inlet and discharge openings lengthwise thereof, said shaft being provided with an opening lengthwise and centrally thereof, a bushing fitting in said opening in the shaft and provided with annular channels and grooves extending lengthwise and forming a communication between said channels, said grooves communicating with one of the channels of the shaft, means forming a communication between the channels of the tube and one of the cylinders, a channel forming a communication between one of the jacketed cylinders and one of the channels of the shaft whereby a medium may be caused to circulate around the bushing and around the cylinders and to and through the shaft again, and a normally stationary valve arranged within the bushing and provided with inlet and discharge ports adapted to communicate at the proper time with the cylinders.

20. The combination with a plurality of cylinders each provided with a jacket forming an inclosed space round each cylinder, of a shaft rotatably held to the cylinders and provided with inlet and discharge openings lengthwise thereof, said shaft being provided with an opening lengthwise and centrally thereof, a bushing fitting in said opening in the shaft and provided with annular channels and with lengthwise grooves forming a communication between said channels, said grooves communicating with one of the channels of the shaft, means forming a communication between the channels of the bushing and one of the cylinders, means forming a communication between one of the jacketed cylinders and one of the channels of the shaft whereby water may be caused to circulate around the bushing and valve and around the cylinders and to and through the shaft again, a valve arranged within the tube and provided with inlet and discharge ports adapted to communicate at the proper time with the cylinders, and means for holding the valve stationary.

21. The combination with a casing having a plurality of radially disposed cylinders each provided with a jacket forming an inclosed space around each cylinder, pistons movably held in the cylinders, a shaft held to rotate with the cylinders and provided with inlet and discharge openings lengthwise and intermediate the ends thereof, means forming a communication between one of the channels of the shaft and one of the cylinders, and means forming a communication between one of the cylinders and one of the channels in the shaft whereby a cooling medium may be caused to circulate around the cylinders and to and through the shaft again.

22. The combination with a cylinder casing having a plurality of cylinders each provided with a jacket forming an inclosed space around each cylinder, of pistons movable in the cylinders, a shaft held to rotate with the cylinders and provided with inlet and discharge openings lengthwise thereof, and means forming a direct communication between the channels and the shaft whereby a cooling medium may be caused to pass from within the shaft to and about the cylinders and then to and through the shaft again.

23. The combination with a casing having a hollow base member and an inclosing cap member, of annular cam members having extensions thereon forming bearings and interposed between the cap member and base member so that the entire casing will be closed to adapt the base to hold the lubricant therein, of a cylinder casing having a plurality of radially disposed cylinders adapted to rotate within said casing, a shaft supported in the bearings and fixed to the cylinders, pistons held to reciprocate in the cylinders, means operated by the cams to reciprocate the pistons, and channels and openings communicating with the interior of the casing whereby the operating parts may be lubricated as the cylinder casing rotates.

24. The combination with a casing having a hollow base member and an inclosing cap member, of annular cam members having extensions thereon forming bearings and interposed between the cap member and base member so that the entire casing will be closed to adapt the base to hold the lubricant therein, of a plurality of cylinders adapted to rotate within said casing, a shaft supported in the bearings and rotating with the cylinders, pistons held to reciprocate in the cylinders, means operated by the cams to reciprocate the pistons, and channels and openings communicating with the interior of the casing whereby the operating parts may be lubricated as the cylinders rotate.

This specification signed and witnessed this 29th day of February A. D. 1908.

ISAAC PATRICK.

Witnesses:
E. R. LOWENHAUPT,
WM. DIETZ.